United States Patent [19]

Benedict et al.

[11] 4,029,214

[45] June 14, 1977

[54] STOCK HANDLING APPARATUS

[75] Inventors: Andrew G. Benedict, Quakerstown; Thomas E. Marker, Wind Gap, both of Pa.; Herbert J. Schmidt, Glen Head, N.Y.

[73] Assignee: MCP Facilities Corporation, Glen Head, N.Y.

[22] Filed: Sept. 2, 1975

[21] Appl. No.: 609,509

[52] U.S. Cl. .............................. 214/1 P; 198/431; 198/442; 214/152

[51] Int. Cl.[2] .............................. B65G 47/26

[58] Field of Search .................. 214/2.5, 1 P, 1 PB, 214/6 TS, 3.1, 152; 198/31 R, 31 AB, 29, 30, 105, 127 R, 431, 442, 456, 459

[56] References Cited

UNITED STATES PATENTS

| | | | |
|---|---|---|---|
| 3,310,080 | 3/1967 | Delcellier | 198/29 X |
| 3,406,838 | 10/1968 | Davidson | 214/1 PB |
| 3,630,392 | 12/1971 | Cintract | 214/1 P |
| 3,718,062 | 2/1973 | Gilvar | 198/105 X |
| 3,800,980 | 4/1974 | Takeuchi et al. | 214/1 PB |
| 3,812,951 | 5/1974 | Fullaway | 214/1 P |
| 3,870,169 | 3/1975 | Kojima | 198/29 X |

*Primary Examiner*—L. J. Paperner
*Attorney, Agent, or Firm*—Bauer, Amer & King

[57] ABSTRACT

Apparatus for simultaneously transporting and coating bar stock has a conveyor system and a loading device feeding a coating station. A plurality of stock pieces are serially fed into the loading device and temporarily stored therein for concomitant movement to the coating station.

9 Claims, 10 Drawing Figures

FIG. 6
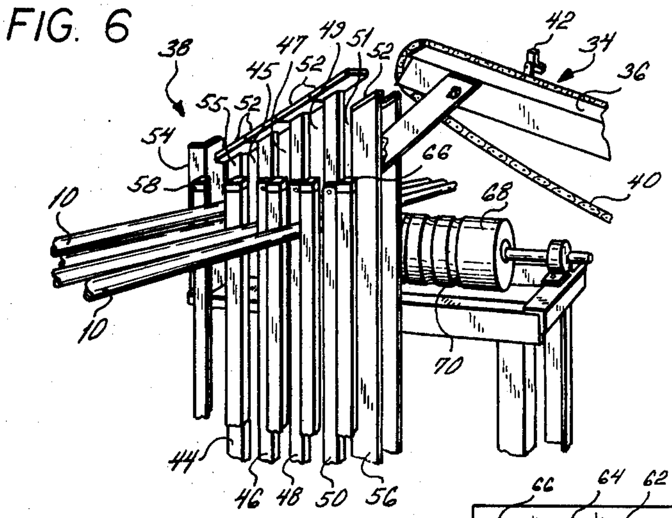
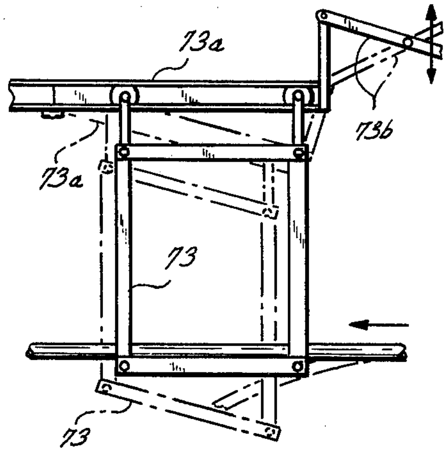
FIG. 10
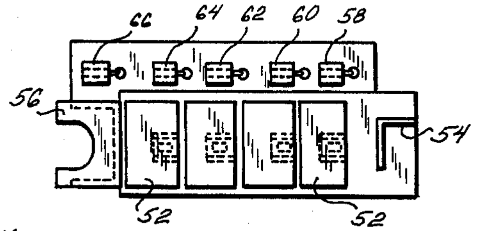
FIG. 9
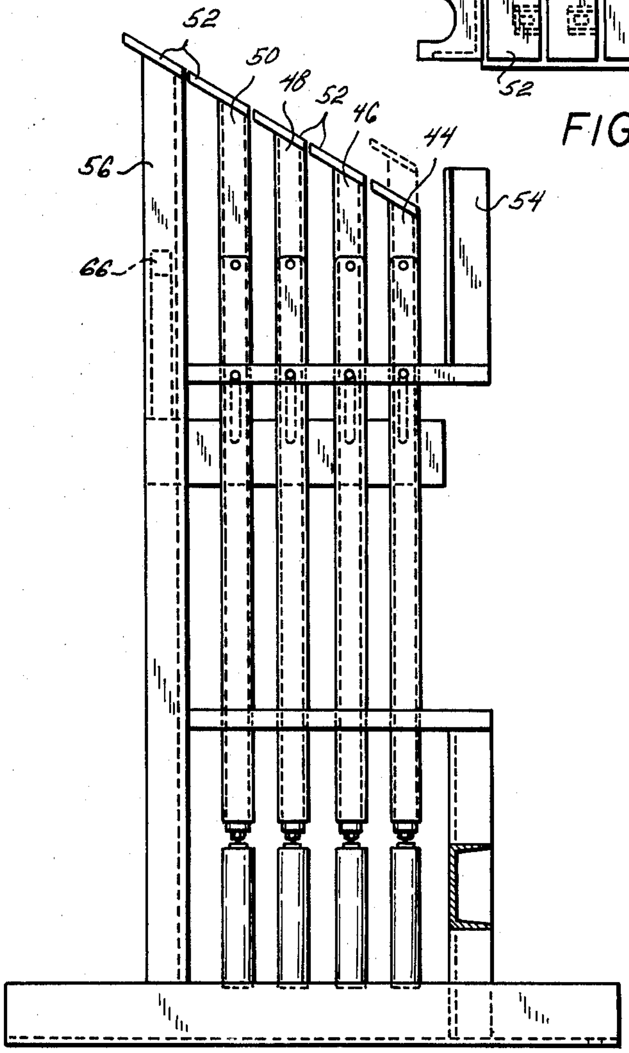
FIG. 7
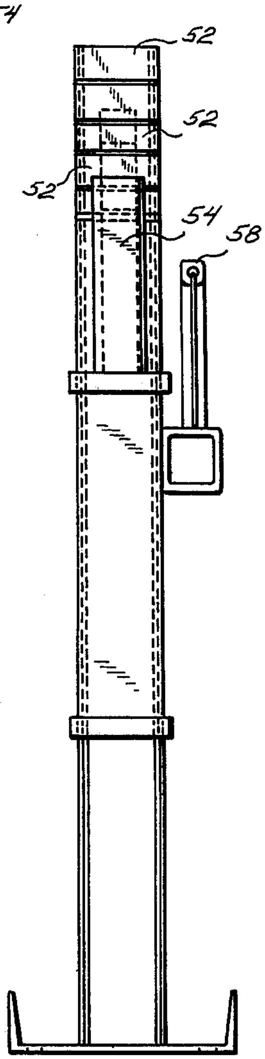
FIG. 8

STOCK HANDLING APPARATUS

FIELD OF INVENTION

This invention relates to a method and apparatus for handling and coating bar stock and more particularly the present invention relates to an automatic system for simultaneously feeding and coating a plurality of stock pieces.

BACKGROUND OF INVENTION

The fabrication of common elements such as reinforced concrete, prestressed architectural members and various building materials utilize reinforcing bars, commonly referred to as "rebars." Rebars have corroded although embedded in concrete roadbeds when attacked by seawater and chloride ions in deicing salts. It has been found that if the rebars are coated with a suitable resistant coating the corrosion and decay of the rebars in the concrete is prevented.

The diameter of these bars typically range from about 60mm to 3cm and when the structural elements in which these rebars are employed reach lengths of over 2 meters, it becomes difficult to handle the rebars. Difficulty is encountered because for the relatively large diameters, the weight of the rebars grows rapidly with length, and whether heavy or not, long lengths of reinforcing stock becomes cumbersome to move. Then, too, it would be highly desirable to provide an automatic system for handling rebars of various sizes and thereby eliminate the labor expense associated with transporting the stock.

Since the cost of the coating of the rebars add substantially to the cost of the bars it would be advantageous to coat several of same simultaneously and thus eliminate the "waiting" time associated with single feeding or feeding one at a time and thereby reduce manufacturing costs.

Several devices are available to move these rebars yet most, if not all, utilize a serial feed. That is, after one rebar has been selected and operatively positioned, it is then moved to the next station and a new rebar is repositioned in the spot that is vacated. This serial feed technique is adequate for relatively small production rates but is ill suited for volume production of rebars particularly as applied to the needs of reinforced concrete construction.

The present invention overcomes several disadvantages of prior art devices and provides a means for handling and feeding several elongated elements concomitantly. In general, the present invention employs a unique serial loader that holds and supports a plurality of stock pieces. The stock is sequentially fed to the loader for storage therein spaced configuration. When the loader if filled the stock is caused to move to the next station. By means of the serial loader of this invention a plurality of stock is simultanteously transferred to an adjacent station. Further, the serial loader includes means to maintain the relative spacing between the stock during its travel from the loader. This permits coating of a plurality of stock pieces with the pieces being fed simultaneously and in spaced configuration.

OBJECTS OF THE INVENTION

It is therefore an object of the present invention to provide apparatus for handling elongated bar stock.

It is another object of the present invention to provide a feeding system employing a conveyor device to feed the stock to a serial loader with the loader temporarily storing the stock in a spaced configuration.

It is still a further object of the present invention to provide a stock handling and coating system employing several discrete stations with one of the stations including a serial loader designed to serially receive a plurality of stock pieces and hold the same in a spaced configuration.

It is yet another object of the present invention to provide a stock handling apparatus that includes a conveyor system and serial loader with transport roller means adapted to automatically and simultaneously move the stock from the loader in a spaced configuration.

Other objects and features of the present invention will become apparent from the following detailed description considered in connection with the accompanying drawings. It is understood, however, that the drawings are designed for purposes of illustration only and not as definition of the limits of the invention for which reference should be made to the appended claims.

BRIEF DESCRIPTION OF THE DRAWINGS

FIG. 6 is a perspective view of the serial loader showing the same partially loaded and also revealing the transport roller used to move the loaded stock array to an adjacent station.

FIG. 7 is an elevational view in detail of the inventive serial loader with one of the movable fingers thereof in phantom and shown in an extended configuration to receive and guide a stock piece during the loading operation.

FIG. 8 is an elevational view along the line 8—8 of FIG. 7 and looking in the direction of the arrows;

FIG. 9 is a top plan view of the apparatus shown in FIG. 7.

FIG. 10 is an elevational view of a transport carriage assembly according to the present invention.

DETAILED DESCRIPTION OF THE DRAWINGS

Figure 1:
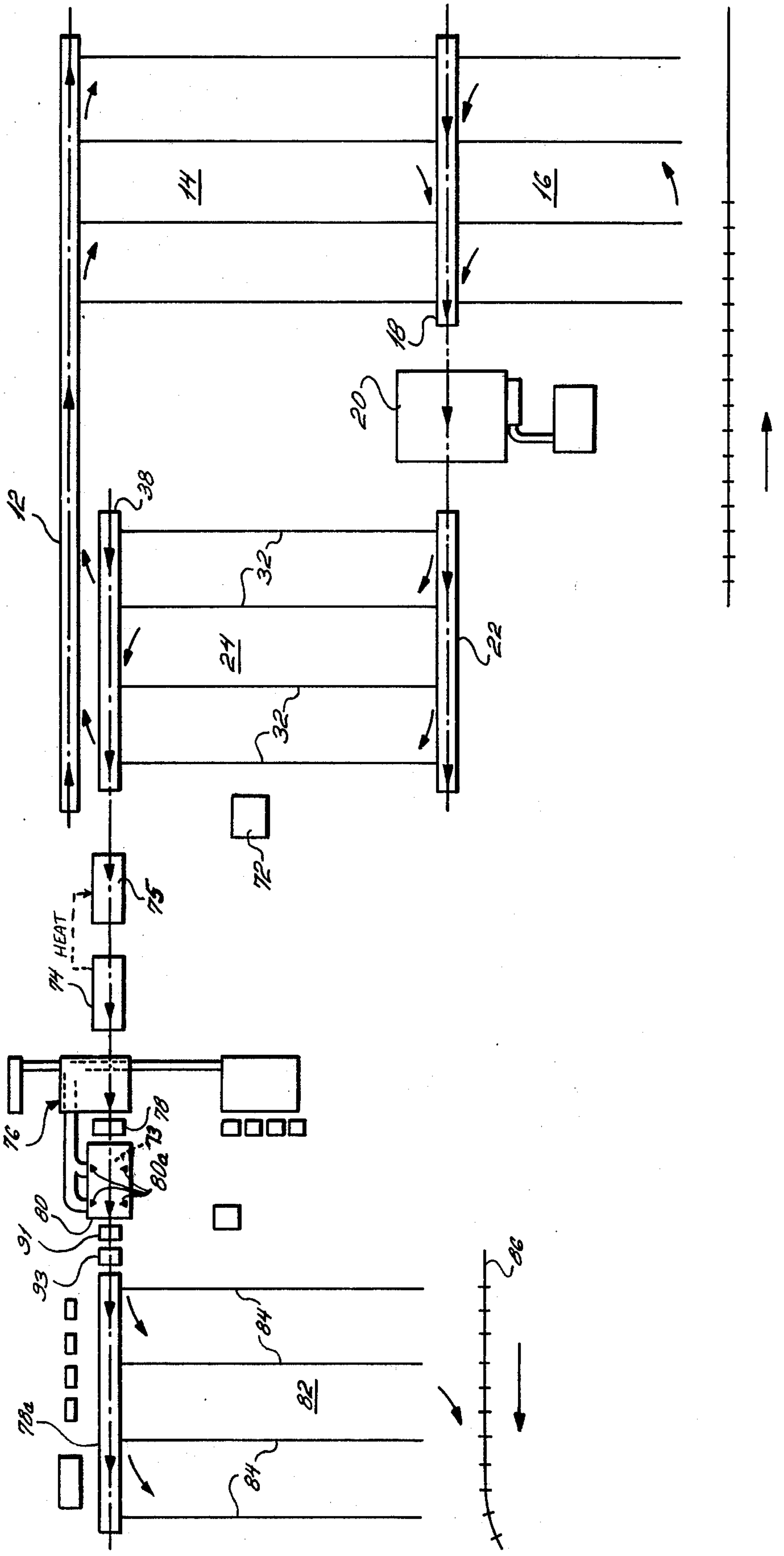
FIG. 1 is a schematic representation of the several stations of the inventive stock handling apparatus.
Figure 2:
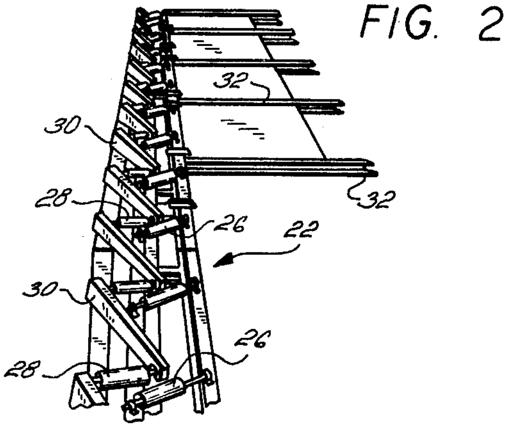
FIG. 2 is a perspective view showing the conveyor system used for transporting the stock along a portion of the inventive apparatus.
Figure 3:
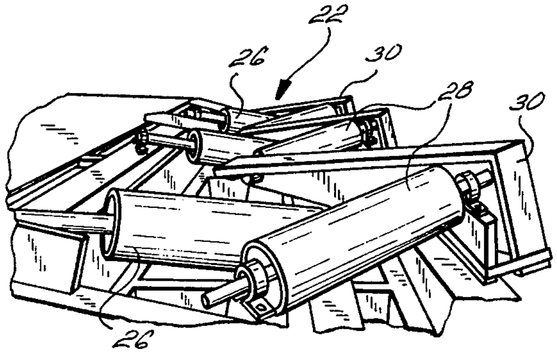
FIG. 3 is a perspective view oppositely directed from that seen in FIG. 1 and showing the angular disposition of the roller scheme according to the present invention.

Referring now to the drawings there is shown in FIG. 1 an overall plan view schematically and functionally indicating the various stations of the present apparatus. Incoming stock 10 is placed on return conveyor 12 on which it is conveyed and fed to storage racks 14 and 16. In processing, stock 10 is fed from racks 14 and 16 to a conveyor 18 of an inclined roller configuration more fully described hereinafter. Conveyor 18 feeds the stock which normally is steel reinforcing rods into a mechanical blast cleaner 20. By mechanical abrasion, cleaner 20 denudes any of the oxide film or rust on the periphery of the rebar. Conventionally, mechanical blast cleaner 20 propels metal abrasive from a centrifical wheel for the mechanical abrasion. Stock 10 leaves the output side of cleaner 20 and is fed onto a take-up conveyor 22 of the same construction as conveyor 18. After the cleaned stock is fed onto conveyor 22 it drops therefrom onto a holding and inspection area 24. In detail now and referring to FIGS. 2 and 3 there is shown in roller configuration comprising either conveyor 18 or 22. Take-up conveyor 22 consists of a plurality of spaced rollers 26 and 28 set at a skewed angle with respect to each other and with respect to the central longitudinal axis of the conveyor. It will be seen from looking at FIG. 3 that outboard roller 28, outboard relative to the location of holding and inspection area 24, is set on an incline by means of a roller support 30. The skewed angularity of roller 28 with respect to roller 26 provides a resting area or dihedral angle causing the stock to proceed along or in the apex of this dihedral defined by the skewed orientation of the roller pairs.

The elevational tilt of roller 28 imparts an angular spin to the stock about the stock's longitudinal axis as the same proceeds along the spaced roller pairs 26 and 28 that comprise conveyor 22. By a conventional transfer scheme, that might include a trip dog, the stock is transferred from conveyor 22 to inspection zone 24. Inspection zone 24 includes a plurality of spaced rails 32 to provide a landing area to receive the stock. One end of each of rails 32 is at or immediately beneath conveyor 22 while the other ends of the rails communicates with a transfer approach station indicated generally by reference numeral 34. Rails 32 incline or rake downwardly as they proceed towards approach 34 whereby indicated the raked configuration of rails 32 provides a gravitational feed for transfer approach 34. Further, feeding of transfer approach station 34 is enhanced by the rotational acceleration imparted to the stock by means of conveyor 22 during operation of the inventive apparatus as will be described shortly. Transfer approach station 34 extends for the broadside length of stock 10 with the approach including a chain feed system more particularly described below.

Figure 4:
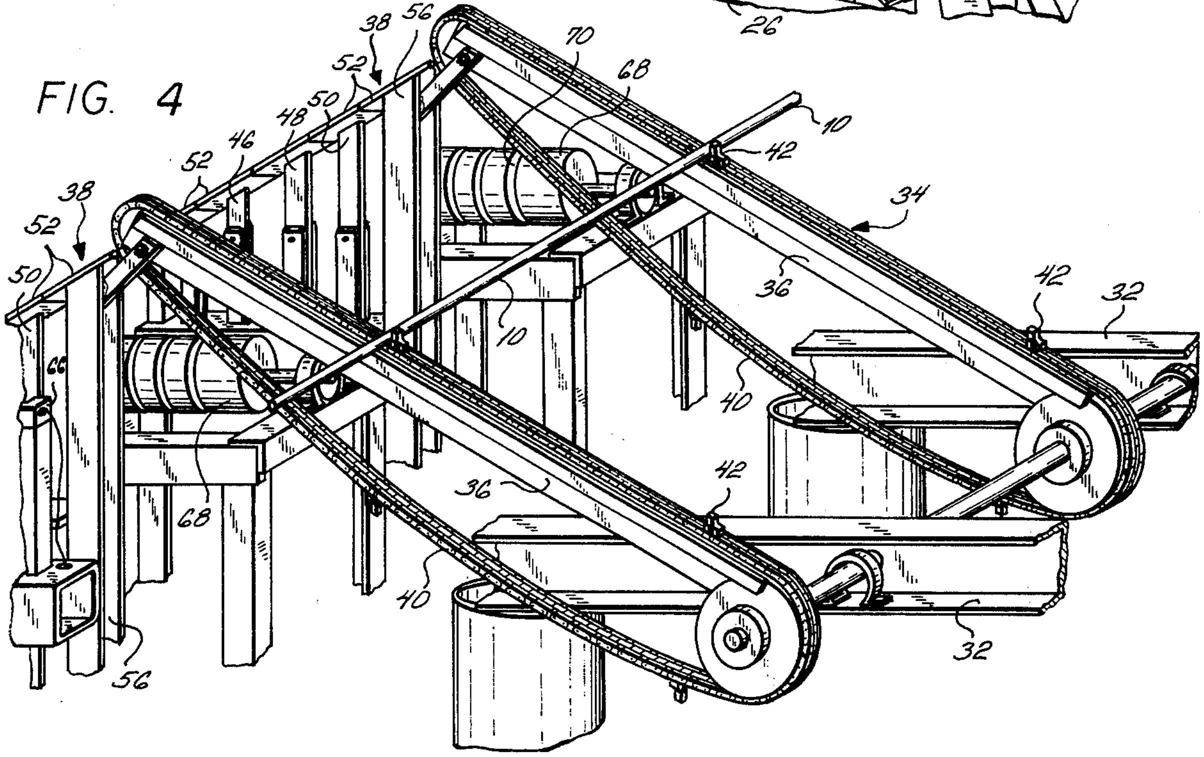
FIG. 4 is a perspective view of the means for feeding the serial loader.
Figure 5:
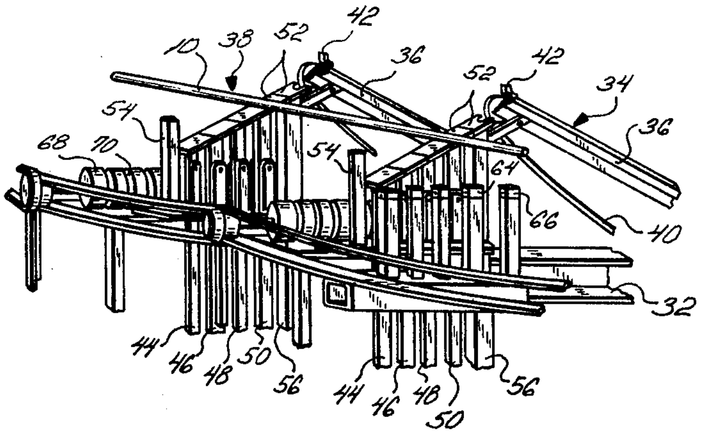
FIG. 5 is another perspective view of the feeding means of FIG. 4 showing how the stock is deposited from the same onto the serial loader.

Referring now to FIGS. 4, 5 and 6, the construction of transfer approach station 34 includes a plurality of inclined carriage assemblies each comprising a plurality of ramps 36. One end of each ramp 36 communicates with and is at the elevation of rails 32 while the other end of each ramp 36 communicates with a serial loader indicated generally by reference numeral 38. In a conventional manner, an endless chain 40 is suspended between the opposed ends of each lift ramp 36 with each of the chains carrying one or a plurality of lift dogs 42. The lift dogs of each chain move in tandem and are maintained at the same spacing so that as a piece of stock 10 proceeds towards the transfer zone 34, it is "caught" on dogs 42 and parallel lifted thereby. This lifting action evenly moves the stock up ramp 36 in a direction towards the serial loader 38. As stock piece proceeds up the plurality of ramps 36, it is eventually deposited onto the serial loader 38.

Each serial loader 38 is operatively positioned adjacent an associated ramp 36. As dogs 42 reach the end of their travel on the top a corresponding one of ramps 36, they push stock piece 10 off of same and onto the plurality of serial loaders 38.

In construction each of the serial loaders is identical and comprises a plurality of spaced, inline and moveable fingers 44, 46, 48, and 50 each of varying size. Further each of the fingers is capped by a canted top part 52. Thus, when looking at either FIGS. 5 or 6 it will be seen that the relative heights of adjacent fingers 44, 46, 48 and 50 in combination with the sizing of caps 52 provide for a sloping landing surface tilted upwards towards transfer approach 34 and adapted to receive the stock when pushed off by dogs 42. A leading stop member or stationary finger 54 is positioned inline and spaced from leading finger 44. Similarly, a trailing stop member or stationary finger 56 is positioned inline and spaced from trailing finger 50. Finger 56 is likewise topped with a cap 52 that maintains dimensional continuity with the plane defined by the other ones of caps 52 associated with the aforesaid moveable fingers. The adjacent spacing between fingers 54, 44, 46, 48, 50 and 56 is sized to accommodate the outside dimension of the largest stock piece anticipated.

Each one of fingers 44, 46, 48 and 50 is adapted to move independently and vertically between a retracted and an extended position. The former position is seen in FIG. 5 and the latter position is seen in FIG. 6. This selective finger movement is accomplished by a conventional telescoping arrangement that comprises each movable finger. The prime mover or means to provide the vertical lifting force on each one of movable fingers 44, 46, 48 and 50 can be either a pneumatic, hydraulic, magnetic, or a mechanically operated motive scheme. Irrespective of the motive means used to provide the vertical lifting and displacement for each moveable finger, it is to be understood that the relative increment of displacement for each finger is substantially the same.

And, as noted the vertical movement of each finger is independent one from the other with each independent movement being controlled by a scheme of sense elements 58, 60, 62, 64 and 66. By way of example, the semse elements may be electrically energized coils with corresponding one of the sense elements with its magnetic field extending in an associated loading space 55, 45, 47, 49 and 51 between respective vertical guide elements or fingers 44, 46, 48, 50 and 56. Each one of the sense elements constitutes an electronic metal sensing device, the activation of which is initiated by the dropping of a stock piece into one of loading spaces 55, 45, 47, or 51 causing serial lifting of an adjacent finger as will be described hereinafter. The stock passing through the field disturbs the pattern generating a pulse which is sensed and used to provide a control signal. Such electronic sensing devices are commercially available.

A plurality of transport or holding and drive rollers 68 are each spaced with respect to an associated loader 38 as seen in FIG. 4. Each one of rollers 68 is formed with a plurality of spaced annular grooves 70 laterally on the roller with each of the rollers in registration with an associated loader 38 or so that the grooves of the roller align with the loading spaces 55, 45, 47, 49 and 51 between loader fingers 54, 44, 46, 48, 50 and 56. Each roller 68 is adapted to revolve about its longitudinal axis with all of the rollers being driven in tandem by a conventional chain drive as is common in the art and therefore not shown. The rollers, or more particularly the grooves thereof, are vertically positioned so that as the stock drops into a respective loading space or slot between the fingers, it comes to rest on an associated one of grooves 70. After loaders 38 have been supplied with bar stock in the sequential operation to be described next, motive power is applied concomitantly to the rollers which causes the loaded stock to simultaneously move from loaders 38 in a spaced array.

Operation of the loader is as follows. As the stock proceeds up approach ramps 36 by action of dogs 42 as described previously, it drops onto the receiving ramp of serial loader 38 defined by relative canting of each of the caps 52. The stock rolls down the landing ramp provided by the close spacing of each of caps 52 until it strikes the opposed side of leading finger 54. Upon striking member 54, the stock drops downwardly in the loading space 55 between member 54 and finger 44 until it comes to rest on an associated and aligned groove 70 of each of rollers 68. As the stock drops downwardly in loading space 55, it trips a switch mechanism actuated by sense element 58. This sends a logic signal to an appropriate control station 72 whereby control station 72 effects activation of the motive means causing lifting of finger 44 to its extended position. By appropriately and selectively applying motive means to the telescoping sections of finger 44, the same is caused to lift approximately 2 to 5 inches which action is seen in phantom in FIG. 7. After member 44 has been lifted thereby displacing cap 52 from the plane defined by the remaining caps associated with retracted elements 46, 48, 50, 52 and stationery finger 56, the next stock piece is approaching end of travel on approach ramp 34. As this second piece of stock is displaced off of transfer approach 34, it proceeds down the runway provided by remaining caps 52 associated with trailing stationary finger 56 and retracted fingers 50, 48 and 46 until the stock strikes the now projecting opposed face of extending finger 44. Upon striking this face of finger 44, the stock moves downwardly in loading space 45 defined between opposed portions of members 44 and 46. Thus, as was described with reference to movement of stock into loading space 55, the stock drops in this second slot, space 45, and comes to rest on an associated groove 70 of roller 68. As the second stock piece drops into loading space 45, it activates sense element 60. Activation of sense element 60 sends a logic signal to control station 72. Station 72 then affects a lifting or extension of finger 46 substantially to repeat the aforementioned loading sequence with a subsequent piece of bar stock coming off the transfer approach 34 and loading into space 47. By repeated and serial extension of the remaining movable fingers, loader 38 fills with stock in spaces 49 and 51 as fingers 48 and 50 are sequentially lifted. As was described previously this lifting action routes the stock into loading spaces 49 and 51. As the last, and in the embodiment shown, fifth, piece of stock it strikes the extended and opposed face of finger 50 drops into space 51 and activates sense element 66.

The tripping of sense element 66 sends a logic signal to control station or element 72 which momentarily effects a stopping of the movement of chains 40 and hence a momentary stoppage of the lifting of stock along approach ramp 34. Further, the signal provided by the sense element 66 controls the motive power supplied to the array of rollers 68 causing them to revolve about their longitudinal axis. Tandem rotation or rollers 68 effects concomitant moving of the plurality of stock from serial loaders 38 towards a heating zone 74. Further still, the signal provided by sense element 66 causes the control member 72 to reset or retract extended fingers 44, 46, 48 and 50. Retraction of these fingers causes them to reposition to their original retracted and unloaded positions as seen in FIG. 7. Several seconds after activation of element 66, which time allows for the clearing or moving stock from within the serial loading zone, the control member initiates driving of chains 40 which action reinstitutes the loading sequence as above described.

As the plurality of stock pieces proceed from serial loaders 38, it is in a spaced configuration and in this configuration the stock array moves to a precisely controlled heating zone 74 schematically indicated in FIG. 1. In heating means 74 the stock is heated to the required process temperature. Conventionally, such heating is accomplished by exposing the stock to a blast of heated air. Since the stock does not fully absorb all the heat energy to which it is exposed, the expent, albeit still heated air, is routed to a heat transfer or pre-heat station 75 where most of the remaining heat energy in the air is recovered.

The spaced bars pass through the primer spray area 76 where they may receive a coating of primer preparatory to their final protective coating. From primer spray booth 76 the bars move onto a plurality of take-off conveyors 78, one for each stock piece. Preferably each conveyor is similar to conveyors 18 and 22 that were shown and described in detail in FIGS. 2 and 3. Conveyor 78 causes the stock to revolve about its longitudinal axis as it moves the stock past an array of spray nozzles 80*a*. Nozzles 80*a* are electrostatically charged with respect to the stock which charge is applied to the protective coating material causing its electrostatic attraction onto the array of bar stock passing the nozzles. Since conveyor 78 causes the stock to turn or revolve about its longitudinal axis, as the stock passes nozzles 80*a* its periphery is evenly protective coated.

As the stock array moves through spray area 80, the leading tip portions thereof may tend to deflect downwardly. Consequently, a reciprocating carriage assembly 73 may be used to support the leading stock portions and thereby prevent the stock from drooping or deforming downwardly as it proceeds through the spray area.

Carriage or transport device 73 is seen in detail in FIG. 10. As the plurality of stock pieces leave take-off conveyor 78, conveyor 73 is operatively positioned adjacent to the take-off conveyor so as to receive the leading and drooping portions of the stock. The positioning of the carriage is accomplished by causing or allowing a pivoted overhead support track 73*a* to drop downwardly by means of a control linkage 73*b*. The prime mover operating control linkage 73*b* can be either a pneumatic, hydraulic, magnetic or a mechanically operated motive scheme. Once the tips of the bar stock catch or engage carriage 73, the same is pivoted upwards into a horizontal configuration by operation of means 73*b*. Carriage 73 including the stock is then tandemly driven, leftward when looking at FIG. 10 through the final spray area 80, and delivers the stock onto the continuing portion of take-off conveyor 78*a*. As the stock is conveyed through the spray areas, described, carriage 73 is sent back towards take-off conveyor 78 and is again tilted downwardly to receive a new supply of stock pieces.

After passage through nozzle station 80, the bars proceed along conveyor 78 through a series of water spray nozzles 91 which temper the exterior of the coating for subsequent handling. They continue along the conveyor to a holiday detector 93.

The holiday detector is an electrically conductive brush which wipes the surface of the coated stock and when a bare spot appears completes an electrical circuit to actuate a paint sprayer. The paint sprayer dispenses a spray of a marking paint at the uncoated region. Thereafter a worker will manually touch-up the stock piece.

The bars are then simultaneously discharged or dumped from conveyor 78 onto an inspection and cooldown area 82. Area 82 is similar to the track or rail array comprising the holding and inspection areas 24 and so includes a plurality of rails 84. However, rails 84 of inspection area 82 are covered with a protective jacketing to prevent damage to the protective coating on the stock when the same is displaced onto the rails. From cooldown and inspection station 82 the stock moves to a shipping station 86 from where it is distributed.

Presently it is preferred to employ epoxy resins to form the protective coating.

While only a few embodiments of the present invention have been shown and described, it will be apparent that many changes and modifications can be made hereto without departing from the spirit and scope hereof.

What is claimed is:

1. Stock handling apparatus for temporarily storing and transporting bar stock including, conveyor means to receive and transport the stock, serial loader means including a plurality of loading spaces for serial loading a plurality of stock pieces, said loading spaces being defined between a plurality of fingers that are in a spaced configuration, means to feed the stock to said serial loader means to be stored therein and positioned thereby in spaced configuration for concomitant movement therefrom, and transport roller means having means to receive and position a plurality of stock pieces in spaced configuration as they are received in said loading spaces.

2. The apparatus of claim 1 wherein a plurality of said fingers are movable from a retracted to an extended position, and sensing means in each of said plurality of loading spaces to effect the serial movement of each of said movable fingers to the extended position and thereby guide incoming stock to the next available one of said plurality of loading spaces.

3. The apparatus of claim 2 wherein said sensing means include reset means associated with the last one of said plurality of loading spaces to be filled, said reset means causing said transport roller means to move the plurality of stock from said loader means and effect a resetting of each of said movable fingers to their retracted position.

4. The apparatus of claim 3, each of said movable fingers being movable by fluid pressure operated means.

5. The apparatus of claim 4 wherein said conveyor means include a conveyor to move the shock to said feeding means, and a conveyor system operatively positioned with respect to said serial loader means to receive the plurality of stock pieces driven therefrom.

6. The apparatus of claim 5 wherein each of said conveyor and conveyor system includes a plurality of spaced roller pairs, each roller pair defined by two spaced rollers with respective roller surfaces thereof defining a dihedral angle, said plurality of spaced roller pairs extending along in longitudinal direction whereby the apex of each dihedral angle aligns along a common line to thereby impart rotational as well as axial movement to the stock as it traverses said spaced roller pairs.

7. A method of handling bar stock during the coating thereof, conveying the stock from a loading zone by means of a first conveyor, feeding the stock onto an approach ramp, depositing the stock from the approach ramp onto a serial loader having a plurality of movable fingers and lifting the fingers in a sequential manner to load the stock pieces into the serial loader in a spaced array, and moving the plurality of stock concomitantly from the loader so that said plurality of stock can be coated simultaneously.

8. The method of claim 7 wherein said loading step is further accomplished by means of a plurality of sense elements each one of which is associated with a loading space, including the step of causing the stock to trigger a respective sense element as it moves into a loading space to thereby cause the lifting of an appropriate finger for guiding the next incoming stock to another one of said loading space.

9. The method of claim 8 wherein said loading step includes the step of resetting the movable fingers upon the loading of the last available loading space.

* * * * *

UNITED STATES PATENT AND TRADEMARK OFFICE

CERTIFICATE OF CORRECTION

PATENT NO. : 4,029,214

DATED : June 14, 1977

INVENTOR(S) : ANDREW G. BENEDICT, THOMAS E. MARKER & HERBERT J. SCHMIDT

It is certified that error appears in the above-identified patent and that said Letters Patent are hereby corrected as shown below:

Column 8, Claim 5, line 10, change "shock" to --stock--.

Signed and Sealed this

*thirtieth* Day of *August 1977*

[SEAL]

*Attest:*

RUTH C. MASON
*Attesting Officer*

C. MARSHALL DANN
*Commissioner of Patents and Trademarks*